Oct. 16, 1951 — T. C. GERNER — 2,571,562
BELL HOUSING REPAIR ASSEMBLY
Filed May 16, 1947 — 2 SHEETS—SHEET 1

Inventor
Theodore C. Gerner
By Clarence A. O'Brien
and Harvey B. Jacobson
Attorneys Oct. 16, 1951  T. C. GERNER  2,571,562
BELL HOUSING REPAIR ASSEMBLY
Filed May 16, 1947  2 SHEETS—SHEET 2
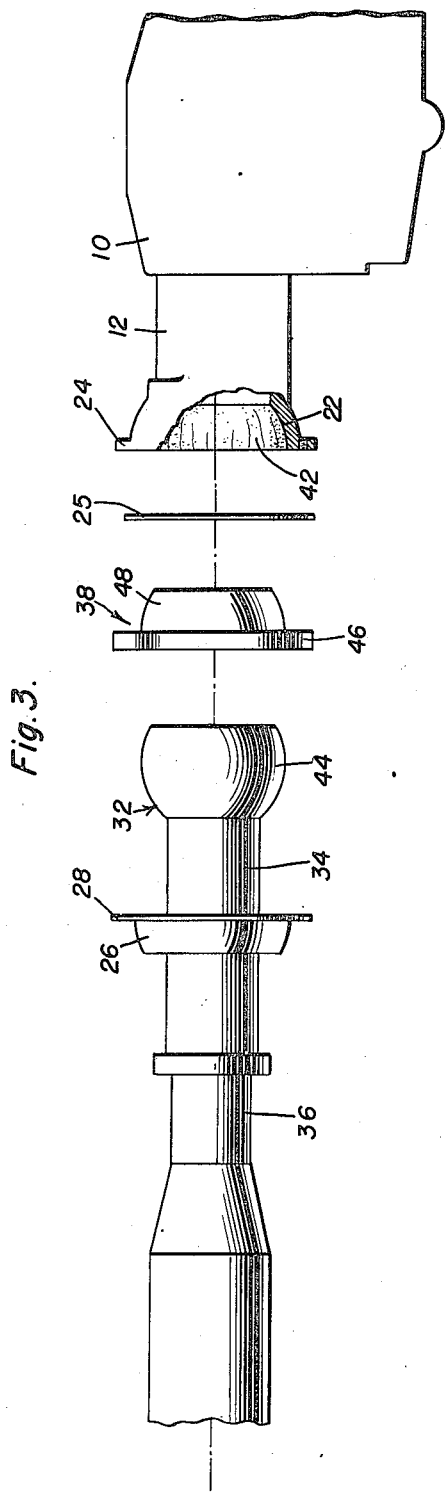
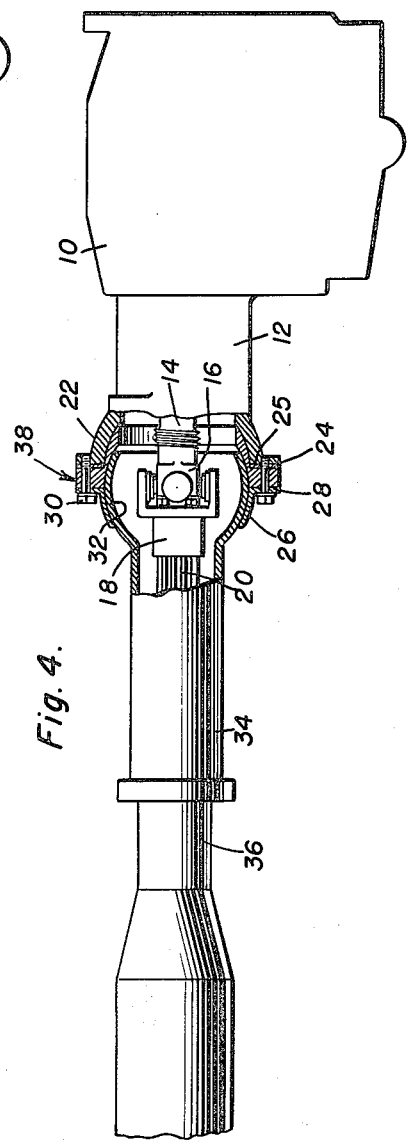
Inventor
Theodore C. Gerner
By Clarence A. O'Brien
and Harvey B. Jacobson
Attorneys Patented Oct. 16, 1951

2,571,562

UNITED STATES PATENT OFFICE 2,571,562

BELL HOUSING REPAIR ASSEMBLY

Theodore C. Gerner, Oklahoma City, Okla.

Application May 16, 1947, Serial No. 748,603

3 Claims. (Cl. 64—32)

1

This invention comprises novel and useful improvements in a bell housing repair assembly and more specifically pertains to a reconditioning or replacement unit for restoring the worn surfaces of the bearing engagement of a bell housing and its seat, in certain types of automotive vehicle drive shaft assemblies.

In order to better understand the purposes and fundamental concept of this invention, the following explanation will be of assistance. In certain types of automotive vehicles and in particular in the well-known Chevrolet automobile made in the years 1929 through 1947 inclusive, there is a necessary and appreciable longitudinal movement or sliding engagement of the propeller shaft housing with relation to the transmission driving shaft. This movement is occasioned by the rear end spring mounting arrangement of the Chevrolet automobile, and is a result of the flexing of the springs, and is particularly noticeable during the application of the service brakes of the vehicle. In order to tolerate and accommodate this relative longitudinal movement, this make of automobile is provided with what is known as a bell housing assembly. This consists of a sleeve surrounding the propeller shaft, which sleeve is provided with an enlarged semi-spherical hollow end forming a bell housing surrounding the universal joint which connects the transmission drive shaft with the propeller shaft of the vehicle and which bell housing is swively received in a bell housing seat extending from the rear of the transmission case assembly. By this construction, the bell housing has a ball and socket engagement with the transmission case, and may freely swivel relative thereto; while the propeller shaft is splined to the universal joint and may move longitudinally thereof, and the propeller shaft housing has free longitudinal movement within the bell housing sleeve.

The foregoing construction is well-known, and is embodied in millions of well-known Chevrolet automobile cars. As will readily be appreciated, the swivelling and sliding movement of the associated parts soon results in excessive wear between the bell housing and its seat, which permits a detrimental and objectionable rattle or knock between these parts due to the excessive wear and clearance developed thereby, and further results in a leakage of grease from the associated mechanisms. In order to correct this defect, it has heretofore been necessary to remove or partially dismantle the rear end and the propeller shaft housing of a car, in order to replace the bell housing sleeve when excessive wear

2 occurs upon its external spherical surface. If excessive wear occurs in the bell housing seat, it has heretofore been necessary to remove or disassemble the associated parts of the transmission case. Moreover, since the wear occurs on both the exterior surface of the bell housing and the interior surface of the bell housing seat, it is obvious that a satisfactory repair will frequently necessitate the replacement of both of these elements. Obviously, the prior art and prior commercial method of replacing these parts required a very considerable expenditure of time and labor and were extremely costly.

It is therefore a primary object of the invention to provide means for reconditioning worn propeller shaft bell housing assemblies for restoring the same to the desired exactness and preciseness of fit in their journalling engagement.

A very important purpose of the invention further consists in providing a means in accordance with the preceding objects, which may be installed and applied without the necessity for dismantling either the rear end or the transmission case assembly of the car.

A still further aim of the invention is to provide a repair means in accordance with the foregoing objects which shall be compact and of light weight and may be readily and directly installed without requiring any further treatment or reconditioning of the worn surfaces.

Another most important object of the invention is to provide a repair means as set forth in the foregoing purposes, which shall be universally applicable to the different spacings of bolt holes found in different models of Chevrolet bell housing assemblies.

And a final important purpose of the invention to be specifically enumerated herein, has as its aim the provision of a bell housing assembly repair unit as defined in the preceding objects, which may readily be installed in the permissible longitudinal variations in length which may be effected in the conventional propeller shaft and universal joint assembly.

These, together with various ancillary objects of the invention which will later become apparent as the following description proceeds, are attained by this device, a preferred embodiment of which has been illustrated, by way of example only, in the accompanying drawings, wherein.

Figure 2:
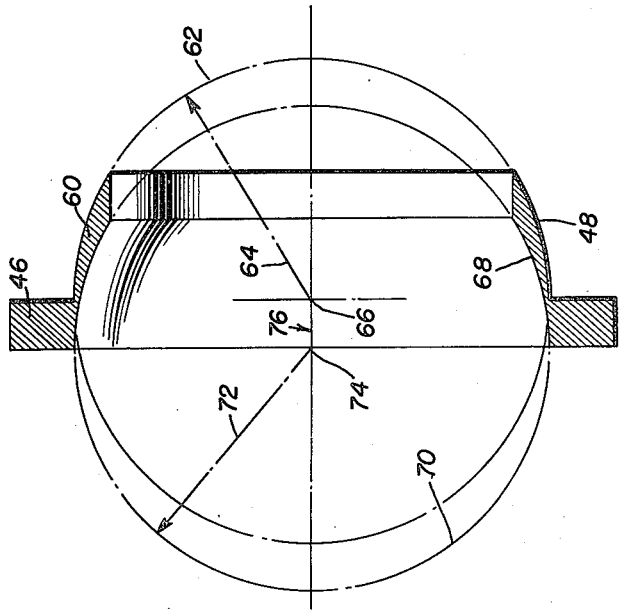
Figure 2 is a vertical sectional view through the unit shown in Figure 1, the centers and radii of curvature of the bearing surfaces being diagrammatically indicated therein.

Figure 3 is a group assembly view, shown in side elevation, with certain parts broken away and shown in section for illustrating the interior construction thereof, of the associated parts together with this repair unit in proper position therein; and, Figure 4 is a side elevational view, parts being shown in section, illustrating the method of applying and using the repair unit in a bell housing assembly.

Referring now more specifically to the annexed drawings, wherein like numerals designate similar parts throughout the various views, attention is directed first to Figures 3 and 4 for a better understanding of the assembly with which the device is used. There is indicated generally at 10 in diagrammatic form, a portion of the transmission casing of an automotive vehicle preferably of the Chevrolet type. Extending rearwardly from the transmission casing 10, is a hollow casing or extension 12 through which extends the transmission driving shaft 14 having one member 16 of a universal joint secured to the outer extremity thereof. The other member 18 of the universal joint assembly has the customary splined engagement with a splined end 20 of a propeller shaft which at its other extremity is connected to the differential mechanism for driving the rear axles of the vehicle.

The universal joint members 16 and 18 are housed within a protective casing which is known in the art as a bell housing assembly. This assembly comprises a semi-spherical hollow extension 22 extending rearwardly from the casing 12, which extension 22 is provided at its outer end with an annular flange 24 which is customarily provided with four bolt holes which are internally threaded for engagement by the retaining means of the bell housing assembly.

Customarily, a washer 25 is seated upon the flange 24, and is compressed between the flange 24 and a correspondingly shaped and bored flange 28 carried by a retaining ring member 26 which is likewise spherically segmental in shape. Conventional bolts 30 extend through the aligned bores in the flanges 28, gasket 25 and flange 24 for clamping these parts into fluid-tight engagement with each other and for completing a spherical segmental inner bearing surface carried by the members 26 and 42 as shown in Figure 3, in the member 22. These segmental spherical surfaces constitute the bearing means for swivelly journalling the semi-spherical enlarged hollow end 32 constituting a bell housing and having a rearwardly extending tubular bell housing sleeve 34 attached thereto. The correspondingly machined forward end 36 of the propeller shaft housing is slidingly received in the internal bore of the sleeve 34, thus permitting relative longitudinal movement between the housing 36 and the sleeve 34. It will thus be seen that as the front end of the propeller shaft housing 36 slides backward and forward in the sleeve 34, there is likewise a slight up and down movement of the same which is accommodated by the swivelling engagement between the bell housing 32 and the inner spherical surface of the retaining ring 26 and of the member 22.

As a result of this swivelling movement, excessive wear eventually occurs upon each of the bearing surfaces involved, as for instance, upon the bell housing seat 42 of the member 22 as indicated in Figure 3, upon the exterior surface of the bell housing 44 as indicated in Figure 3, and likewise although to a lesser extent upon the inner surface of the retaining ring 26.

In order to compensate for this excessive wear, and to restore the oil-tight sealing engagement between these relatively movable parts, which has been destroyed by the excessive wear, the insert element indicated generally at 38 is employed.

This repair unit consists of a body having a flange 46 from which extends a dish-shaped portion 48. The flange is provided with three radially enlarged bosses 50 and with a fourth circumferentially elongated radial boss 52, a bore or aperture 54 being provided in each of the bosses 50 for alignment with the corresponding bores in the retaining flange and bell housing seat flange of the bell housing assembly.

Figure 1:
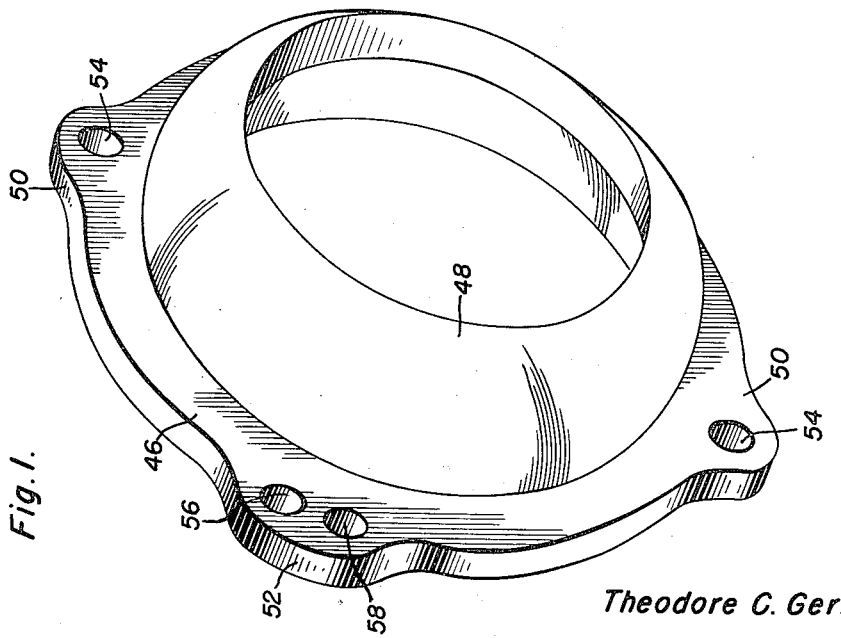
Figure 1 is a perspective view of the bell housing assembly repair unit.

The fourth enlargement 52 is provided as shown best in Figure 1, with a pair of bores 56 and 58, appropriately spaced for registration with the fourth bore of the Chevrolet bell housing assembly. As is well-known, in the Chevrolet bell housing assemblies of passenger cars for the years 1929 through 1939 and 1941 through 1947, the fourth hole is differently spaced from the fourth hole in the 1940 Chevrolet assembly. In both of these different types of assemblies, the other three holes correspond to the apertures 54 and are evenly spaced but this fourth hole has a different spacing. The arrangement is such that a single repair element may be selectively employed for either of these two spacings of retaining holes in the bell housing assemblies. Referring now to Figure 2, it will be seen that the dish-shaped portion 48 is provided with an external bearing surface 60 which is the segment of a sphere as indicated by the dotted line 62, having a radius 64 and a center 66 disposed centrally of and in the plane of the forward wall of the flange 46. The spherical segmental surface 60 is preferably of the same radius as that of the worn bell housing seating surface 42 of the member 22, whereby the same may be partially received within and seated upon said surface 42.

The inner surface 68 of the member 48 is likewise a segment of a sphere as indicated at 70, having the radius 72 and center 74. The center is disposed centrally of the plane through the rear or other vertical face of the flange 46, and preferably the radius 72 is identical with the radius 64, it being noted that the distance between these centers 74 and 66, as indicated at 76, is of substantially the same thickness as the flange 46. This inner bearing surface 68 therefore has the same radius of curvature as the outer surface 60 of the repair element and also corresponds and is substantially identical with both of the surfaces 42 and 44 of the bell housing assembly.

It is evident that different radii may be employed in various embodiments of the invention. Thus, the radius 64 of the surface 60 may be slightly larger than the original, unworn radius of curvature of the bearing surface 42, to compensate for and make a tight fit with said surface after the latter has been worn; while the inner bearing surface 68 if desired may be of slightly less radius than that of the surface 44 of the bell housing, in order to compensate for wear and make a tight fit therewith. Moreover, although the centers of the two spherical surfaces 60 and 68 have been shown disposed upon the central longitudinal axis of the unit, it is evident that other spacings and positions may be resorted to.

Further, although a pair of apertures 56 and 58 have been shown in the flange 46, in order to permit the unit to be applied to different spacings of apertures in the bell housing assemblies, it will be evident that elongated slots could be employed for this same purpose, whereby a single unit can be employed to effect repairs in the above mentioned different types of bell housing assemblies.

In utilizing the device, it is merely necessary to disengage the bolts 30, release the retaining ring 26, and withdraw the bell housing 32 with the sleeve 34. The universal members 18 and 16 may be then disengaged, and member 18 withdrawn from the end of member 16 and the end of the transmission driving shaft 14, whereupon the unit 38 may be interposed therebetween and positioned as shown in Figures 3 and 4. Obviously, in some instances it may be found desirable to form the unit 38 in two or more complementary parts, whereby the same may be inserted without the necessity for disconnecting the universal joint members 18 and 16.

However, in the preferred form, the integral repair unit is positioned upon the gasket 25 and against the flange 24 of the bell housing seating member 22, and the bell housing 32 then inserted therein, and the retaining ring 26 drawn into position and the retaining bolts 30 applied to the aligned apertures. As will be evident, the parts are then drawn into tightly clamped position, whereby the surface 48 seats tightly upon the correspondingly shaped original bell housing seat 42, while the surfaces 68 and 44 have a socketed, swivelling engagement.

It will thus be seen that this invention provides a replacement insert which may be readily interposed, with a minimum expenditure of time and labor, between the bell housing and the bell housing seat of a bell housing assembly and when so inserted will provide a new bell housing bearing engagement for restoring the requisite closeness of fit between the bell housing and its seat, to restore the parts to their desired relationship.

Obviously, numerous modified and equivalent constructions will readily occur to those skilled in the art after consideration of the foregoing specification and accompanying drawings and accordingly, it is not desired to limit the invention to the exact construction shown and described, but all suitable modifications and equivalents may be resorted to falling within the scope of the appended claims.

Having described the invention what is claimed as new is:

1. A repair unit for bell housings comprising a replacement bearing insert having outer and inner bearing surfaces, said surfaces comprising spherical segments of substantially the same radius as the bearing surfaces of a bell housing, and a flange carried by said insert for attachment to a bell housing flange, said flange having circular parallel surfaces, the center of said spherical surfaces coinciding with the centers of the circular parallel surfaces.

2. The combination of claim 1 wherein said flange has apertures registering with bolt holes of said bell housing flange, and a further aperture means selectively registerable with variable spaced bolt holes of different makes of bell housing flanges.

3. The combination of claim 2 wherein said apertures comprise three holes registerable with three corresponding holes of said bell housing flange and said further aperture means comprises a pair of apertures selectively registerable with the variably spaced fourth bolt holes of different makes of bell housing flanges.

THEODORE C. GERNER.

REFERENCES CITED

The following references are of record in the file of this patent:

UNITED STATES PATENTS

| Number | Name | Date |
| --- | --- | --- |
| 816,240 | Mehlig | Mar. 27, 1906 |
| 1,644,412 | Bredar | Oct. 24, 1927 |